April 9, 1963  A. F. REILLY  3,084,497

HAY TEDDER

Filed March 1, 1961

INVENTOR.
ALFRED F. REILLY
BY
*Barlow & Barlow*
ATTORNEYS

United States Patent Office 3,084,497
Patented Apr. 9, 1963

3,084,497
HAY TEDDER
Alfred Francis Reilly, 216 Bermuda Lane,
Palm Beach, Fla.
Filed Mar. 1, 1961, Ser. No. 92,517
1 Claim. (Cl. 56—370)

This invention relates to a hay tedder apparatus or hay handling machine in which a swath of hay lying in the field may be picked up and re-laid rearwardly of the device in a position to one side but parallel with the original swath.

One of the major problems in handling hay is in the drying thereof. Drying is accomplished in two ways, one in the field and other in a storage shed where artificial means are employed. It is impractical, however, to pick up and bale hay when the moisture content of the hay is high. It has been found in practice that if one leaves hay on the field too long to dry through the action of the sun, that a lot of the nutrient value of the hay is lost. Also a lot of the grain structure of the hay will be destroyed, and it is therefore important to dry the hay as fast as possible on the field until the moisture content thereof has been reduced to a satisfactory level for baling purposes. To accelerate drying, it is sometimes seen to be practical to travel down the windrows and pick up the hay and redeposit it, or it has been the practice in the past to fork the hay by hand or through some machinery means in order to fluff it up to accelerate this drying process. I have found, however, that the hay may be more readily dried in a faster manner if it is picked up in a fashion which will tend to remove some of the moisture therefrom.

It is, therefore, an object of the invention to provide a hay tedder that is constructed so as to pick up the hay from the windrows, remove some of the moisture therefrom as it passes through the pickup device and then redeposit the hay in another swath.

Another object of the invention is to provide a device which during the pickup and transferring of the swath redistributes the orientation of the hay leading to a more efficient air circulation in the swath and permitting the swath to be air cured more rapidly and efficiently.

A more specific object of the invention is to provide a hay tedder which is constructed to gather the hay, pass the hay over a series of rollers which tend to pick up and throw the moisture therefrom and redeposit the hay onto the ground in a porous mass.

Still another object of the invention is to provide a hay tedder attachment for a tractor which may be power driven from the power take-off device of the tractor and coupled by a three-point attachment to the tractor, thus embodying simplicity in construction and economy in operation.

With these and other objects in view, the invention consists of certain novel features of construction as will be more fully described and particularly pointed out in the appended claim.

Figure 1:
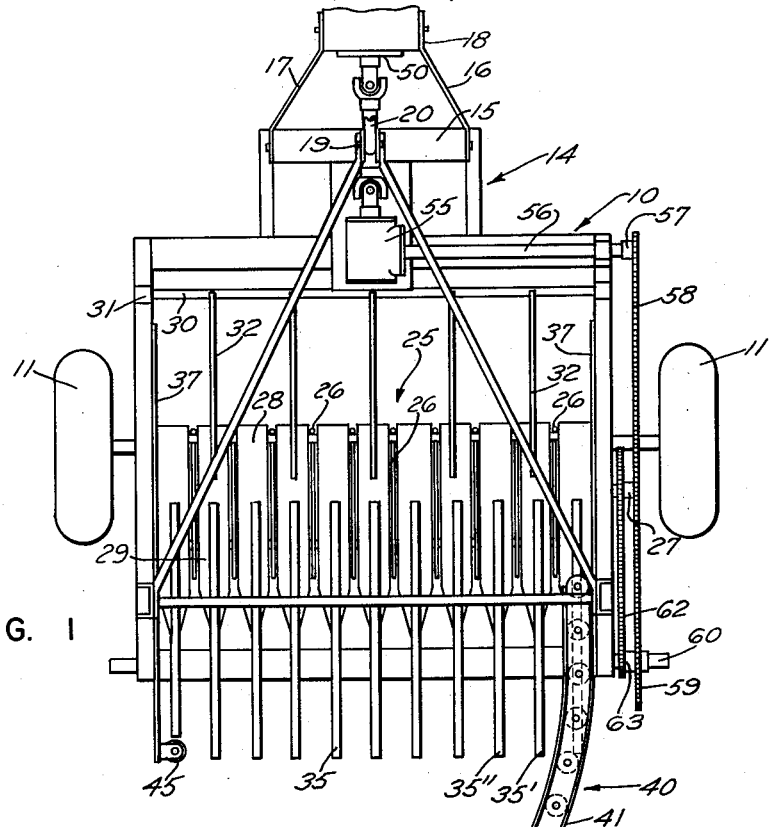
FIGURE 1 is a top plan view of a hay tedder machine embodying my invention.

The swath turning assembly according to the present invention comprises basically a hay pickup unit and a turning unit mounted on the rear end thereof. The pickup unit is designed to gather the hay from the windrow and convey it rearwardly of the machine where there will be found a number of vertically arranged rollers that are oriented in an arcuate path and a plurality of spaced rods that might be termed a large fork that have tines arranged in a manner to distribute or deposit the hay in a parallel windrow.

The machine illustrated comprises a generally rectangular frame member 10 or chassis which has rotatingly secured thereon a pair of groundwheels 11. A hitch assembly 14 is provided and extends slightly forwardly of the frame 10 and has vertically oriented therefrom a yoke 15. A pair of links 16 and 17 are pivotally secured to either side of the yoke 15 and extend forward to pivotally attach at a suitable location on the body of the tractor such as on a common axis 18. The apex of the yoke 19 has affixed thereto an adjustable link 20 which has its other end suitably fastened to a hydraulically actuated link arm (not shown) so that the entire apparatus may be raised and lowered with relation to the ground. Effectively to accomplish this action, the yoke is swung from its general vertical attitude, and this carries with it the entire frame in another arc whose center may be found at the yoke 15.

The hay pickup mechanism indicated generally 25 is supported on the frame 10 and may be of any approved manufacture, such as that shown in United States Patent No. 2,674,839, and be operable to pick up hay from the windrow and convey it to a location rearwardly of the machine to be redeposited on the ground in accordance with this invention. The unit herein shown, briefly comprises a skeletonized cylinder which carries a plurality of tines 26 (see FIG. 9 of cited patent). A shaft 27, which is suitably mounted in bearings in the frame 10, supports the cylinder for rotation. The pickup tines 26 are adapted to project between spaced apart stripper plates 28 that are supported on the frame of the unit. The stripper plates 28 define a portion of a cylindrical surface which extends around the skeletonized cylinder and rearwardly to form a rear platform as at 29. The forward end of the pickup mechanism is provided with a wind guard which comprises a rotatable rod 30 that is journalled as at 31 to the frame 10. Spaced hold-down strips or rods 32 are carried by the rod 30 and extend over the stripper plates 28 being biased toward the stripper plates by means of a spring means (not shown). In this fashion the hold-down rods or strips insure that the crop will be fed properly.

Figure 2:
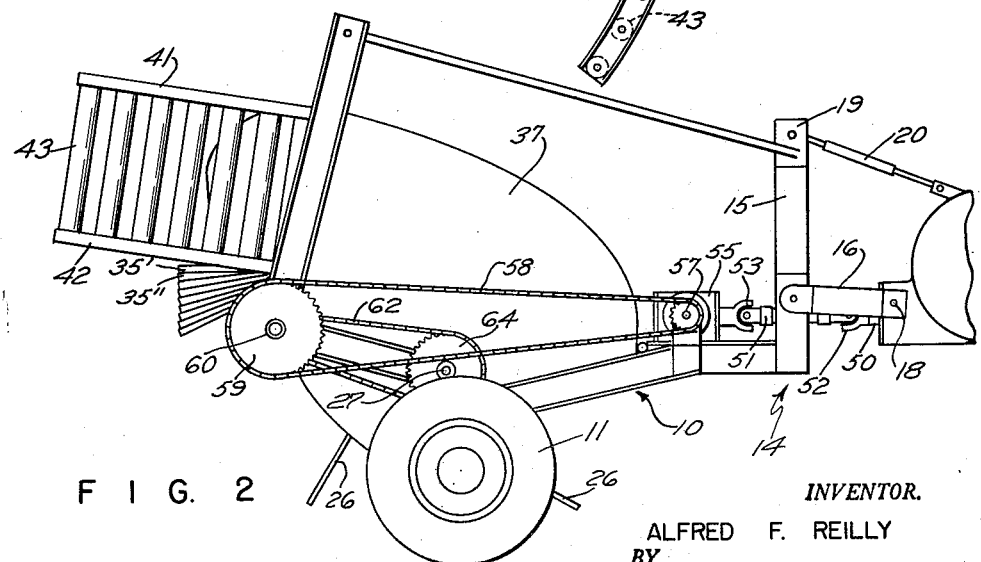
FIGURE 2 is a side elevational view of the machine of FIGURE 1.

On the rear platform 29 of the stripper plates 28 there is mounted a plurality of tedder rods 35. These rods 35 are shown as being substantially equally spaced apart and of substantially equal length. As seen in FIGURE 2, the rods 35 are angularly disposed in a progressive order so that at one side, the rod which is indicated 35' will be at the highest level, and the next adjacent rod 35" will be at a slightly lower level so as to extend in a downward curvature towards the left-hand side of the machine as viewed in FIGURE 1. There is thus formed a platform on which the hay may be discharged from the tines 26, the hay being moved on the rods 35 by the action of the tines 26 against the hay bulk. Since there is present a downward curvature towards the left side of the machine as viewed in FIGURE 1, the hay will fall from the machine in this direction. To direct the hay in the proper path over the stripper plates 28, a pair of side plates 37 are provided which side plates are fastened to the frame 10 and terminate in the vicinity of the rods 35. As was mentioned previously, it is important when hay passes through this apparatus to dry it as much as possible as well as to turn over the swath into a different windrow.

The drying apparatus which is utilized in the present invention is shown generally at 40 and consists of a pair of arcuate frames 41, 42 which are spaced in a vertical direction and which have rotatably mounted therebetween a plurality of longitudinally spaced rollers 43. As best seen in FIGURE 1, these spaced rollers extend from the vicinity of the tines 35 rearwardly of the apparatus to overhang therefrom and curve in towards the center line of the machine. In this fashion when hay is delivered toward the rear of the machine through the action of the tines 26, it will be thrown against the rollers 43 where frictional contact will take place. If the hay has moisture thereon in the form of water droplets, these water droplets will be transferred to the surface of the rollers 43. Since the hay is moving at some velocity rearwardly of the machine, the frictional contact will also rotate the rollers 43 and by centrifugal force the water droplets transferred to the surface thereof will be thrown off into the atmosphere. To provide a similar action at the left-hand side of the machine, a single roller 45 is shown as being mounted at the end of the side plates 37. This particular roller, or rollers if more than one is utilized, will also prevent any binding of the hay at this particular location on the mechanism, since some force will be exerted by the hay in the general direction of the left-hand side of the machine as viewed in FIGURE 1 due to the combined action of the arcuate rollers 40 and downwardly directed rods 35.

Preferably the unit is driven from a power take-off connection at the rear end of a tractor as at 50. The connection may include a stub shaft 51 provided with universal joints at either end thereof as at 52, 53 which connect the power take-off into an angular drive member 55. The output shaft 56 from this drive member extends to one side of the frame 10. On this shaft 56 there is mounted a drive sprocket 57, and a chain 58 connects this sprocket with a driven sprocket 59 on an idler shaft 60. From the idler shaft 60 a chain 62 trained over sprocket 63 and sprocket 64 mounted on shaft 27 rotates the skeletonized cylinder and moves the tines 26.

In operation the unit is attached to the tratcor by the three-point suspension. It is oriented relative to the ground so that the groundwheel 11 strikes the ground only occasionally, the entire weight of the machine being carried actually by the three-point suspension which secures the proper clearance between the tines 26 and the ground. The hay as it is picked up by the tines 26, is thrown rearwardly where it contacts the rollers 40, moisture being removed therefrom at this location by the centrifugal contact action previously described and is then redeposited on the ground in a windrow spaced from but parallel to the windrow where the hay previously lay. In this fashion the mechanism operates not only in the same fashion as one manually picking up hay with a fork and shaking the fork to open the hay, but also due to the frictional contact removes some of the moisture therefrom so that the moisture content of the hay will be lowered in a fewer number of hours than was previously possible. Accordingly, there is no excessive loss of leaves and shattering that results when dry hay is baled, and baling may begin as soon as the moisture content of the hay has been reduced in the field to between 30 and 40% as calculated in the trade. It will be apparent, therefore, that the hay may be baled with usually one passage of the apparatus of this invention.

I claim:

A hay handling machine comprising a rotary hay pickup mechanism, said rotary hay pickup mechanism having means thereof for attaching it to a vehicle, vertically extending side guide means mounted at either side of the rotary pickup mechanism for guiding the hay to the rear thereof, and a plurality of rollers mounted for rotation about a vertical axis at the rear of the hay pickup mechanism at a position intermediate the side guide means, said rollers arranged in an arcuate path curving towards the center line of the pickup mechanism whereby frictional contact of the hay with the rotatable rollers is had during passage of the hay from the forward end of the pickup mechanism to the rear thereof.

References Cited in the file of this patent
UNITED STATES PATENTS

| | | |
|---|---|---|
| 2,502,599 | Smart | Apr. 4, 1950 |
| 2,552,985 | Leuschner | May 15, 1951 |
| 2,679,720 | Cymara | June 1, 1954 |
| 2,695,487 | Glienke | Nov. 30, 1954 |
| 2,741,892 | Collette | Apr. 17, 1956 |
| 2,815,636 | Reilly | Dec. 10, 1957 |